May 26, 1964     A. L. W. MEISNER     3,134,220
ELECTRIC CLOCK

Filed May 14, 1962     3 Sheets-Sheet 1

INVENTOR
Alfred L. W. MEISNER

May 26, 1964   A. L. W. MEISNER   3,134,220
ELECTRIC CLOCK

Filed May 14, 1962   3 Sheets-Sheet 2

INVENTOR
Alfred L.W. MEISNER

By

May 26, 1964  A. L. W. MEISNER  3,134,220
ELECTRIC CLOCK

Filed May 14, 1962  3 Sheets-Sheet 3

INVENTOR
Alfred. L.W. MEISNER

By

United States Patent Office 3,134,220
Patented May 26, 1964

3,134,220
ELECTRIC CLOCK
Alfred L. W. Meisner, Nurnberg, Germany, assignor to Diehl, Nurnberg, Germany
Filed May 14, 1962, Ser. No. 194,391
Claims priority, application Germany May 16, 1961
15 Claims. (Cl. 58—28)

The present invention relates to an electric clock with a low voltage motor having a continuously uniformly rotating rotor which latter is adapted through the intervention of a buffer spring to drive an oscillating control mechanism.

It is known for purposes of obtaining as uniform a driving force as possible for such clocks, to employ a so-called contactless transistor motor which is fed by a battery of low voltage and the rotor of which produces voltage impulses in a control or trigger coil which impulses after amplification are supplied to a motor driving coil for maintaining the rotary movement of the rotor. This clock work driving mechanism, however, has the drawback that the voltage of the battery in the course of time drops from for instance 1.5 volts to approximately half its voltage whereby the output and speed of the drive motor decrease which is not permissible for a clock work.

In order to reduce this drawback, the drive motor has been so designed that for instance at 0.8 volt it fully covers the power requirement of the clock work. However, in this connection it is necessary to compensate for the excess power of the motor when a new battery is used. Thus, for instance, it is known to provide the drive motor with a control device controlled by the clock work, or to provide a slip clutch or an electromagnetic clutch between the uniformly rotating driving part and the buffer spring. In this way, however, a considerable portion of the power of the battery is wasted and the life span of the battery is thereby considerably reduced. Moreover, in the course of time, the friction values of the employed brakes or clutches change whereby the precision of such electric clocks will be affected.

It is, therefore, an object of the present invention to provide a precision electric clock in which also with decreasing battery voltage the precision of operation of the clock will be fully maintained.

It is another object of the present invention to provide an electric clock as set forth in the preceding paragraph, in which precision of operation of the clock will be maintained throughout the life of the battery without the necessity, when employing a new battery, to compensate for high battery voltage.

These and other objects and advantages of the invention will appear more clearly from the following specification in connection with the accompanying drawings, in which:

FIG. 1 diagrammatically illustrates an electric clock according to the present invention.

*General Arrangement*

Figure 1:
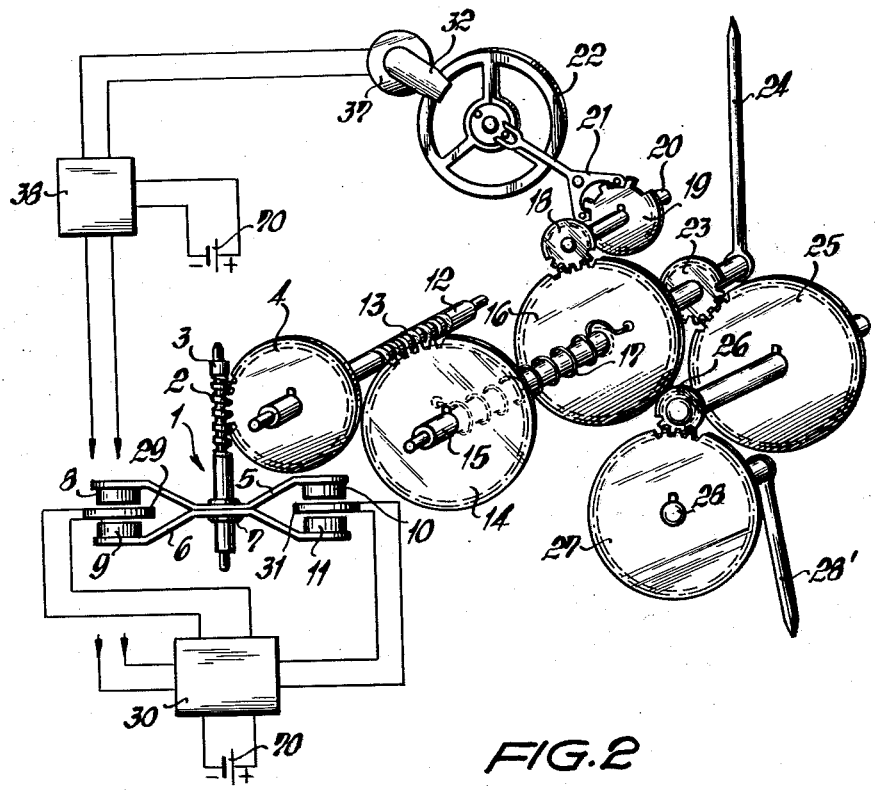

One of the outstanding features of the present invention consists in a control for the low voltage motor of the clock work which control is for practical purposes loss-free. A further feature of the invention is seen in that the controlled drive motor is given a precise speed so that also the pointer mechanism can be directly driven thereby.

The electric clock according to the invention comprises a low voltage motor with a unidirectionally rotating rotor turning at constant speed and while being coupled thereto through a buffer spring is a control device in the form of an escapement mechanism including an escapement wheel with which is associated a balance wheel that is driven by the escapement wheel. In conformity with the present invention, it is suggested to provide the drive motor with means for speed controlling and furthermore to provide means operated by the escapement mechanism by which a control factor will be obtained for changing the speed of the drive motor, which control factor will control the motor in such a way that with decreasing tension of the buffer spring the motor speed will be increased and that with increasing tension of the buffer spring, the motor speed will be reduced whereby a predetermined tension of the buffer spring, which tension is adapted to the power requirement of the speed control means and the braking mechanism, will at least approximately be maintained constant.

According to a further important feature of the invention, a commutatorless low voltage motor fed from a direct current source is employed as clock work drive, while either the stator or the rotor of said motor is provided with at least a permanent magnet whereas the other part is provided with at least one control or trigger coil whereby, due to the relative movement of stator and rotor, voltage impulses are periodically produced in said coil while an electronic amplifier is provided for reinforcing said voltage impulses. These reinforced voltage impulses are conveyed to a driving coil by means of which the rotary movement of the rotor will be maintained. In this connection it is to be noted that the output power of the amplifier should be greater than corresponds to the maximum power requirement of the clock work. Furthermore, the amplifier is to be provided with means for changing the amplifying factor while the control factor obtained between the buffer spring and the speed control means is to represent a voltage which is conveyed to the amplifier through an electric conductor in order thereby to control the amplifying factor of the amplifier for maintaining the speed of the electric motor constant. More specifically, a battery is in circuit with the motor and an electric control element is provided in this circuit for controlling the release of power to the motor and which control element is, in turn, controlled by electric signals from the motor and control device.

With the electric clock according to the invention, the speed control means preferably consists of a balance wheel which is mechanically driven by an escapement wheel and lever. For producing the control factor for the amplifier, according to one embodiment of the invention, at least a permanent magnet and at least one coil is provided within the range of the speed control means. One of these two parts is mounted on the movable speed control means, namely, the balance wheel, whereas the other part is arranged stationarily in such a position relative to the balance wheel that, when a certain amplitude of the balance wheel has been exceeded, control voltage impulses are produced in the said coil by means of which the amplifying factor of the amplifier will be reduced.

According to another embodiment of the invention, the speed control means, preferably designed as a balance wheel, is provided with or is a disc-like element which has at least at one portion an interruption, such as a notch, while in the vicinity of the speed control means there is provided a magnetic arrangement having an air gap across which energy is transmitted. In this gap the shield connected to the speed control means extends and is arranged with regard to the device in such a manner that when a maximum amplitude of the speed control means is exceeded, the interruption in said shield will change conditions in said gap whereby an energy flow will be possible, which latter likewise produces a control voltage conveyed to the amplifier of the drive motor thereby reducing the amplifying factor of the motor amplifier.

*Structural Arrangement*

Figure 2:
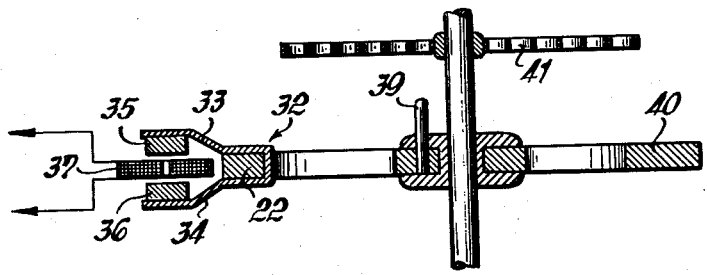
FIG. 2 illustrates partly in section and on a larger scale than FIG. 1 a detail of the clock shown in FIG. 1.
Figure 3:
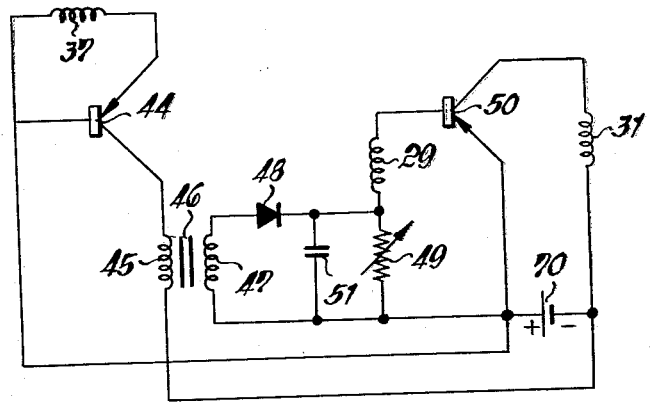
FIG. 3 is an electric diagram for the clock according to the invention.

Referring now to the drawings in detail and FIGS. 1 to 3 in particular, the arrangement shown therein comprises a rotor 1 of a collector-free direct current motor, which rotor is drivingly connected to a gear 4 through the intervention of a worm 2 of a rotor shaft 3. Rotor 1 is composed of two pole plates 5 and 6 having two or more legs, which plates engage each other in the central portion and are pressed together by bushing 7. This bushing 7, in its turn, is pressed upon the motor shaft 3. The legs of the pole plates 5 and 6 are bent symmetrically toward the outside. The parallel ends of said pole plates have small cylindrical permanent magnets 8, 9 and 10, 11 arranged on those sides of said pole plates which face each other. The said cylindrical permanent magnets face each other with opposite polarity and in an air gap between the magnets 8, 9 and 10, 11 form a strong magnetic field which, for all practical purposes, has no magnet leakage.

The above-mentioned gear 4 which is driven by motor shaft 3 connected to a shaft 12 which, in its turn through a worm 13 is drivingly connected with a gear 14 of a seconds shaft 15. Instead of the illustrated worm-gear step-down transmission, also a spur gear step-down transmission may be provided which, as is well known, yields a better degree of efficiency. Behind gear 14 keyed to shaft 15 there is loosely rotatable mounted on shaft 15 a further gear 16 which, through a coil buffer spring 17, is operatively connected to gear 14. This spring 17 which extends around shaft 15 transmits the uniform rotary movement of gear 14 to a gear-train which moves stepwise, said gear-train starting with gear 16. Gear 16 meshes with a pinion 18 keyed to a shaft 18a which, in its turn, has keyed thereto an escapement wheel 19. This escapement wheel 19 imparts an oscillation upon a balance wheel 22 through the intervention of a lever 21.

Furthermore mounted on the uniformly rotating shaft 15 is a pinion 23, while a seconds-pointer 24 is connected to the end of shaft 15. Pinion 23, through the intervention of a step-down transmission 25, 26, 27 drives a minutes shaft 28 which carries a minutes-pointer 28'. An intermediate transmission corresponding to the step-down transmission 23, 25, 26, 27, but not illustrated, is interposed between said minutes shaft 28 and an hours shaft. Instead of connecting the seconds-pointer 24 to the continuously and steadily rotating shaft 15, said pointer 24 could instead be coupled to gear 16, whereby a seconds true time indication would be furnished by the seconds-pointer, while, however, the latter would be advanced in steps.

Rotor 1 is driven in a manner known per se by rhythmic impulses which are, by means of the rotor, induced in trigger coil 29 and are amplified in an electronic stage 30 and are conveyed to a driving coil 31. The control or trigger coil 29 and the working coil 31 are designed as flat air core coils and are stationarily arranged with regard to rotor 1 in such a way that when rotor 1 is turned, said coils 29 and 31 enter approximately simultaneously into the air gaps between the permanent magnets 8, 9 and 10, 11. The polarity of the working coil 31 is so selected that by means of the electric impulse, a field of force will be produced in said working coil 31, which field of force will be opposite to the permanent magnetic field. Rotor 1 thus receives its driving force by repulsing forces. Of course, if the two coils 29, 31 are offset with regard to each other by a corresponding angle, the rotor 1 may also be driven by attracting forces. In the electronic amplifying stage 30, there may be provided a transistor which is fed by a battery such as dry cell 70.

In order to produce a control voltage for the transistor amplifier, an arrangement may be used as illustrated in particular in FIG. 2. To this end, a clamping shoe 32 of ferro-magnetic material is fastened to the balance ring 22. This clamping shoe 32 has its spreading legs 33, 34 bent outwardly, and at the surfaces facing each other, small cylindrical permanent magnets 35, 36 are provided which have opposite polarity. In the air gap between said magnets 35, 36, similar to rotor 1, a strong concentric permanent magnetic field is produced. In the air gap there is provided a flat air core coil 37 which is offset by 180° to the position of the lever 21 with the balance at rest. If the balance wheel 22 is set into oscillation, the field of forces produced by the magnets 35, 36 will in flat air core feed back coil 37 induce an impulse only when the balance wheel 22 oscillates up to 180°. Inasmuch as the impulse magnet depends on the speed of the swinging movement, it increases with the increasing amplitude. The impulses of coil 37 are, as shown in FIG. 1, conveyed to a control stage 38 where they are converted into a control voltage for the amplifier stage 30. The control stage 38 may likewise be equipped with a transistor and be fed by the said current source 70. In its simplest form, this control stage 38 may, for instance, have a diode which blocks the entrance circuit of the amplifier stage 30 to a more or less degree or displaces the working point of the transistor and thereby changes the reinforcing factor thereof.

FIG. 2 illustrates a pin 39 for the fork of the lever 21. Furthermore, the balance wheel 22 is at that side thereof which faces the clamping shoe 32 provided with a compensating weight 40. The arrangement furthermore comprises a spiral spring 41 provided on the speed control member.

FIG. 3 illustrates more in detail a circuit diagram for the electric clock illustrated in FIGS. 1 and 2. The feed back coil 37 of FIGS. 1 and 2 is located in the incoming or base-emitter circuit of a transistor 44 the outgoing or base-collector circuit of which comprises the battery 70 and has in series thereto the primary coil 45 of a coupling transformer 46. The secondary coil 47 of said transformer is through a diode 48 connected with a preferably variable resistor 49 which latter is arranged in series with regard to the control or trigger coil 29 in the base-emitter circuit of a transistor 50. Arranged in parallel to the control resistor 49 is a condenser 51. In the outgoing or base-collector circuit of the transistor 50 there is in series to the battery 70 located the working coil 31 of the motor. The signal of coil 29 to the base of the transistor 80 is in opposition to the signal from secondary 47.

*Operation of the Arrangement of FIGS. 1 to 3*

If, for instance, rotor 1 is started manually, the magnetic field of the permanent magnets 8 and 9 and 10 and 11 will induce voltage impulses in coil 29 which are amplified in the transistor 50 and conveyed to the working coil 31. Due to the alternating effect with the same permanent magnets 8 to 11 the rotary movement of the rotor will be maintained. The arrangement is such, particularly in view of the control resistor 49, that at the smallest still admissible voltage of battery 70, for instance of 0.8 volt, the motor still covers the entire power requirement of the clock work which means that the buffer spring 17 will receive such power that the balance wheel will oscillate with an amplitude in excess of 180° and will do so to both sides. If this amplitude of 180° has been reached or exceeded, the magnetic field between the permanent magnets 35 and 36 will induce voltage impulses in coil 37 which are reinforced in the transistor 44 of the primary winding 45 of the coupling transformer 46. Thise impulses are through the secondary winding 47 of the transformer 46 passed through diode 48 to the condenser 51 whereby at the resistor 49 a further control voltage is produced the polarity of which is so selected that it counteracts the control voltage induced in coil 29. In this way, the power supply from battery 70 through transistor 50 to the motor may be reduced so that the speed of the drive motor will likewise be reduced. With a suitable dimensioning of the arrangement, it is possible in this way to maintain the speed of the drive motor constant also when a variation of the voltage of battery 70 occurs or when the frictional conditions of the clock work vary.

For producing the control voltage impulses in coil 37, a magnetic arrangement is connected with the balance wheel whereby the speed control member is placed under load. This arrangement is also liable to disturbances with regard to outer magnetic fields. These drawbacks have, however, been avoided with the embodiments set forth in FIGS. 4 to 8 of the present case.

Figure 4:
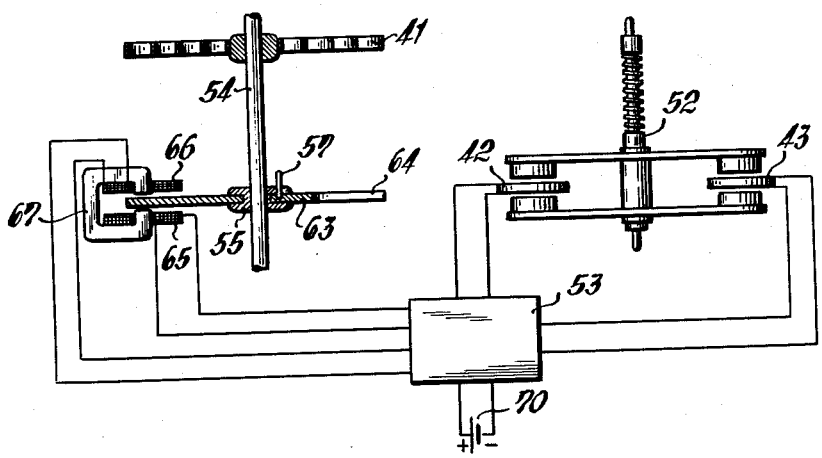
FIG. 4 represents a further embodiment of the invention and, more specifically, of the control mechanism of a clock work according to the invention.
Figure 5:
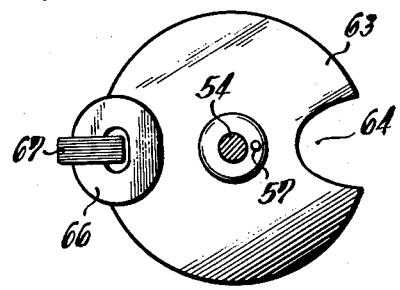
FIG. 5 shows a speed control means employed in FIG. 4, with a device for producing control voltage impulses, FIG. 5 being shown as seen in axial direction.
Figure 6:
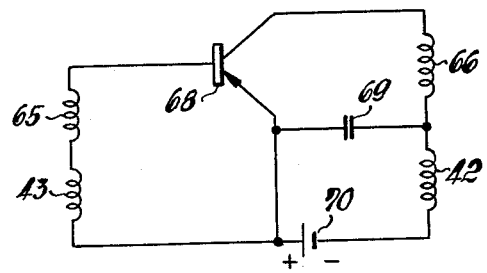
FIG. 6 represents an electric diagram for use in connection with the embodiment of FIGS. 4 and 5.

*Embodiment of FIGS. 4 to 6*

Referring to the embodiments of FIGS. 4 to 6, only those parts of the electric clock work will be described which are essential with regard to the invention. The remaining parts may principally be so designed as was described in connection with FIG. 1. The employed drive motor is designed similar to that of FIG. 1 and comprises a rotor member 52 provided with a permanent magnet, a trigger or control coil 43 which through an amplifier stage 53 furnishes working impulses to a working coil 42. For purposes of feeding the amplifier stage 53, there is also in this instance provided a battery 70 of a low voltage. To produce the control impulses in conformity with the amplitude of the balance wheel, with this embodiment the balance wheel is formed by a disc 63 which has a cutout 64 on that side which is provided with the impulse pin 57. Disc 63 preferably consists of a material of high conductivity, as for instance copper or aluminum. In the position of the cutout 64 offset by an angle of 180°, there is in the rest position of the balance wheel or disc 63 provided a coil arrangement according to which a coil 65 is located below disc 63 while a second coil 66 is located above disc 63. The two coils 65 and 66 are closely coupled to each other through a magnetic core body 67 which latter leaves only a small gap for the oscillation of disc 63. The circuit for the control device will be evident from FIG. 6. The trigger or control coil 43 of the drive motor is in series with the coupling coil 65 located in the base-emitter circuit of the transistor 68 (FIG. 6). In the collector-emitter or working circuit of the transistor 68 and in series to the battery 70, there is arranged the working coil 42 of the motor while coupling coil 66 is arranged in series thereto. Furthermore, between the two coils 42 and 66 on one hand and the emitter of the transistor 68 on the other hand there is arranged a coupling condenser 69.

*Operation of the Arrangement of FIGS. 4 to 6*

The operation of the arrangement of FIGS. 4 to 6 depends primarily on the coupling degree and the polarity of the two coupling coils 65 and 66 in connection with the disc 63 provided with the cutout 64. If the disc 63 carries out only small amplitudes, the gap provided in the ferromagnetic ring 67 is always filled in by disc 63 whereby the two coils 65, 66 are coupled only uniformly. If with such small amplitude of the balance disc 63 the rotor 52 of the motor is started, the rotary movement of the rotor 52 is to be maintained through control coil 43, transistor 68 and working coil 42 as has been described in detail above in connection with the operation of the arrangement of FIGS. 1 to 3. The amplifying factor of the transistor stage 68 is to be selected so high that the corresponding buffer spring 17 (FIG. 1) will be tensioned to such an extent that the balance wheel amplitude of oscillation will reach the value of 180° so that now the cutout 64 changes the coupling between the coils 65 and 66. Thereupon, an alternating effect will take place between the two coils 65 and 66. This alternating effect may consist on one hand in that the coil 66 will in coil 65 induce such a voltage that the amplifying factor of the transistor 68 will be reduced. As a result thereof, the motor output and thereby the motor speed will be reduced.

According to another embodiment of the invention, however, the coupling between the coils 66 and 65 may be so selected that particularly under the effect of condenser 69 a high frequency oscillation will occur which will likewise reduce the amplifying output of transistor 68 and thereby the driving output of the motor. Also in this way a relatively loss-free control of the motor output will be obtained because with the production of a high frequency oscillation, the arrangement will for only a relatively short period receive current.

Figure 7:
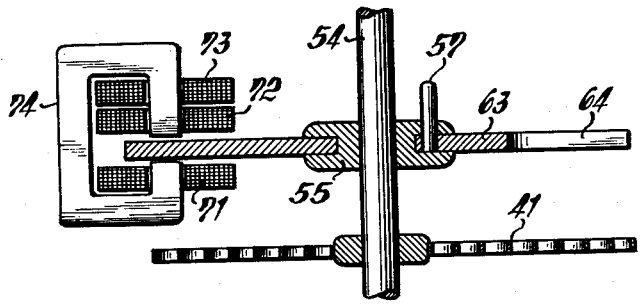
FIG. 7 illustrates a further embodiment of the invention.
Figure 8:
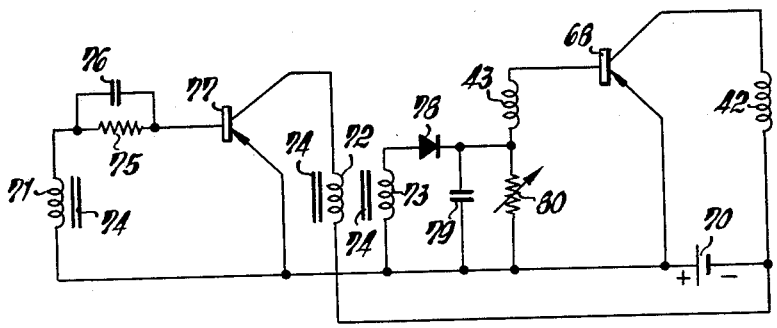
FIG. 8 represents an electric diagram for the embodiment of FIG. 7.

*Embodiment of FIGS. 7 and 8*

The third embodiment of the invention illustrated in FIGS. 7 and 8 differs from the embodiment of FIGS. 4 to 6 primarily in that the motor amplifier 68 is preceded by still another amplifier stage. Also in this instance, for purposes of controlling there is employed a balance disc 63 with a cutout 64. This balance disc which is mounted on shaft 54 oscillates in an air gap of a field core body 74. Below disc 63, on body 74 there is provided a flat coil 71 whereas above said disc 63 there are arranged two flat coils 72 and 73, one above the other. The circuit for this embodiment is shown in FIG. 8. The coil 71 is located in the control or base-emitter circuit of transistor 77 in series with a resistor 75 and a parallel condenser 76. The flat coil 72 is in series with battery 70 in the collector-emitter circuit of transistor 77. The coil 73 of the transformer circuit 74 is in series with a rectifier 78 and in parallel to a preferably variable resistor 80 and a condenser 79 arranged in parallel thereto. The resistor 80 and the condenser 79 are furthermore in series with the control coil 43 in the base-emitter circuit of the transistor 68. In the collector-emitter circuit of the transistor 68 there is furthermore located the working coil 42 which is in series with battery 70.

*Operation of the Arrangement of FIGS. 7 and 8*

The operation of the arrangement of FIGS. 7 and 8 is very similar to that of the preceding embodiment. As soon as the air gap 64 changes the coupling of the transformer 74, a more or less high frequency oscillation will be effected through the feedback coupling between coils 72 and 71. The frequency of this last mentioned more or less high frequency oscillation may be changed by the selection of the resistor 75 in connection with the condenser 76. This more or less high frequency oscillation is conveyed to the third coil 73 of the transformer whereby by means of the diode 78, the condenser 79 is charged so that a control voltage is superimposed upon the base-emitter circuit of the transistor 68, and in subtractive relation to the voltage in coil 43, whereby the amplifying factor of the transistor is reduced. The operation of the control device is thus very similar to that described in connection with FIG. 3 of the first embodiment.

It is, of course, to be understood that the present invention is, by no means, limited to the particular embodiments shown in the drawings but also comprises any modifications within the scope of the appended claims.

What I claim is:

1. An electric clock which comprises; a clockwork driving mechanism in the form of a commutatorless direct current motor, said motor including a first member in form of a stator and a second member in form of a rotor, one of said members being provided with at least one permanent magnet and the other of said members being provided with at least one control coil adapted in response to a relative movement between said stator and said rotor periodically to produce control impulses in said control coil, amplifier means connected to said control coil operable for amplifying said control impulses, at least one operating coil on said other of said members electrically connected to the output circuit of said amplifier means to receive the amplified pulses therefrom and operable for producing driving impulses on said rotor for maintaining the rotary movement of said rotor, said amplifier means having a power output in excess of the maximum power requirement of said clockwork, a non-uniformly rotating escapement wheel and a balance wheel operatively associated therewith, buffer spring means drivingly connecting said rotor with said non-uniformly rotating escapement wheel, said amplifier means including electrical control means responsive to an electrical signal for reducing the amplifying factor thereof, feed back means operatively associated with said balance wheel and sensitive to the oscillation range of said balance wheel for producing an electrical control signal variable in conformity with the oscillation amplitude of said balance wheel, and conductor means connecting said feed back means with said electrical control means of said amplifier.

2. An electric clock according to claim 1, in which said feed back means comprises a stationary feed back coil arranged adjacent the balance wheel, at least one permanent magnet arranged on said balance wheel and so arranged thereon with regard to said feed back coil that when a predetermined oscillation amplitude of said balance wheel is exceeded electrical signals in the form of feed back impulses will be produced in said feed back coil.

3. An electric clock according to claim 1 in which said electrical control means includes a second control coil, a variable resistor arranged in series with said second control coil and a condenser arranged parallel to said resistor, said resistor being so dimensioned that the normal power output of said amplifier is greater than the power requirement of said clock, conductor means interconnecting said feed back means and said resistor for transmitting the electrical signal from said feed back to said second control coil for reducing the power output of said amplifier and thereby reducing the power supplied to said motor so that the tension in said buffer spring means remains at least approximately constant.

4. An arrangement according to claim 1 in which said feed back means includes a stationary feed back coil arranged adjacent said balance wheel, at least one permanent magnet on said balance wheel and so arranged thereon with regard to said feed back coil that when a predetermined oscillation amplitude of said balance wheel is exceeded feed back impulses will be produced in said feed back coil, further amplifier means, said feed back coil being connected in the input circuit of said further amplifier means, and coupling transformer means the primary coil of which is connected in the output circuit of said further amplifier means while the secondary coil of which is connected to said electrical control means of the first mentioned amplifier means.

5. An electric clock according to claim 4 in which both said amplifier means are transistorized.

6. An electric clock according to claim 4 in which the means for reducing the amplifying factor of the first mentioned amplifying means includes a second control coil, a variable resistor arranged in series with said second control coil, condenser means arranged in parallel to said variable resistor, and a diode arranged in series with the secondary coil of said coupling transformer means, said series arrangement of said secondary coil of said coupling transformer and said diode being connected in parallel with said variable resistor.

7. An electric clock according to claim 1 in which said feed back means comprises a shield on the balance wheel which is provided with at least one peripheral interruption, core means arranged adjacent said balance wheel and provided with a gap to allow a flow of energy therethrough and the periphery of said shield being movable in said gap, said interruption being so located with regard to said core means that in response to said balance wheel exceeding a predetermined oscillation amplitude, the interruption in said shield will free said gap whereby the energy flow is freed, and coil means associated with said core means in which feed back signals are developed when energy flows across said gap.

8. An electric clock according to claim 7, in which said shield is made of a non-ferro-magnetic but electrically conductive material, said coil means including two coupling coils arranged on respectively opposite sides of said shield, one of said coupling coils being in circuit with said electrical control means and the other one of said coupling coils being located in the output circuit of said amplifier means whereby when said predetermined oscillation amplitude of said balance wheel is exceeded a coupling is established between said coupling coils, the coupling between said coupling coils being such that the electrical signal developed in said one coupling coil will cause the amplifying factor of said amplifier means will be reduced.

9. An electric clock according to claim 6 in which a coupling condenser is connected in circuit with said coupling coils to bring about an oscillatory condition.

10. An electric clock according to claim 1 in which said balance wheel is provided with shield means provided with at least one peripheral interruption, said shield means being made of non-ferro-magnetic but electrically conductive material, said feed back means including two coupling coils arranged on opposite sides of said shield means, one of said coupling coils being in circuit with said electrical control means of said amplifier means and the other one of said coupling coils being provided in the output circuit of said amplifier means, whereby when said predetermined oscillation amplitude of said balance wheel is extended, a coupling is effected between said coupling coils, the coupling being such that signal developed in said one coupling coil will cause the amplifying factor of said amplifier means to be reduced, a core of ferro-magnetic material of low hysteresis losses extending through said coils, said core being provided with an air gap in which the periphery of said shield means is disposed.

11. An electric clock according to claim 1 in which said balance wheel is provided with shield means provided with at least one peripheral interruption, said shield means being made of non-ferro-magnetic but electrically conductive material, said feed back means including two coupling coils arranged on opposite sides of said shield means at the periphery thereof, a core of ferro-magnetic material with low hysteresis losses extending through said coil, said core being provided with an air gap in which the periphery of said shield means is disposed, said coupling coils being respectively arranged in the input and output circuits of an oscillating stage, said electrical control means including a second control coil, and the coupling coil located in the input circuit of said oscillating stage being coupled to said second control coil.

12. An electric clock according to claim 1 in which said balance wheel is provided with shield means provided with at least one peripheral interruption, said shield means being made of non-ferro-magnetic but electrically conductive material, said feed back means including two coupling coils arranged on opposite sides of said shield means at the periphery thereof, a core of ferro-magnetic material with low hysteresis losses extending through said coils, said core being provided with an air gap in which the periphery of said shield means is disposed, an oscillating circuit, said coupling coils being located in the input and output circuit respectively of said oscillating circuit, said electrical control means including a second control coil, the coupling coil located in the output circuit of said oscillating circuit being coupled to the said second control coil, said second control coil being arranged on said core.

13. An electric clock according to claim 12 in which a condenser is arranged in series with the said second control coil and in which a resistor is arranged parallel to said condenser.

14. An electric clock which comprises; a clock work driving mechanism including a direct current motor, said motor having a stator and a rotor, one of said stator and rotor being provided with at least one permanent magnet and the other thereof being provided with at least one coil adapted in response to a relative movement between said stator and said rotor periodically to produce voltage impulses in said coil, amplifier means for amplifying said voltage impulses and including a source of supply voltage, at least one additional coil electrically connected to the output circuit of said amplifier means and operable for exerting driving impulses upon said rotor for maintaining the rotary movement imparted upon said rotor, said amplifier means having a normal output in excess of the maximum power requirement of said clock work, an escapement wheel, a buffer spring drivingly connecting said rotor with said escapement wheel, a balance wheel, a lever actuated by the escapement wheel and drivingly engaging said balance wheel, said amplifier means including means sensitive to a predetermined electrical signal for reducing the amplifying factor thereof, control means operated by said balance wheel in response to oscillating movement thereof to develop an electrical signal, and conductor means connecting said control means to said means for reducing the amplifying factor of said amplifier means for controlling the amplifying factor of the amplifier means and thereby the power supply to said motor so that the tension of the buffer spring means will be maintained substantially constant.

15. An electric clock comprising; a clock work mechanism, a direct current motor drivingly connected to said mechanism, a battery, electrical means connected in series with the battery and motor and having control means responsive to an electric signal to release power from the battery to the motor in proportion to the voltage of the signal, means operated by the motor to supply a first electrical signal to said control means of a voltage in excess of that required to release sufficient power from the battery to the motor to operate the clock work, an escapement wheel, a spring drivingly connecting said escapement wheel with said motor, an escapement lever driven by said escapement wheel, a balance wheel driven in oscillation by said escapement lever, and means operated by said balance wheel in response to the oscillation thereof attaining a predetermined magnitude for supplying a second electrical signal to said control means the voltage of which is subtractive from the voltage of said first signal thereby to regulate the amount of power released from the battery to the motor to that required to operate the clock work mechanism while maintaining said balance wheel oscillating with a predetermined average magnitude.

References Cited in the file of this patent
UNITED STATES PATENTS

| | | |
|---|---|---|
| 2,829,324 | Sargeant | Apr. 1, 1958 |
| 2,994,023 | Devol | July 25, 1961 |
| 2,995,690 | Lemon | Aug. 8, 1961 |

FOREIGN PATENTS

| | | |
|---|---|---|
| 1,187,982 | France | Mar. 9, 1959 |